(No Model.)
A. P. JOY.
LIFTING JACK.
No. 298,980. Patented May 20, 1884.
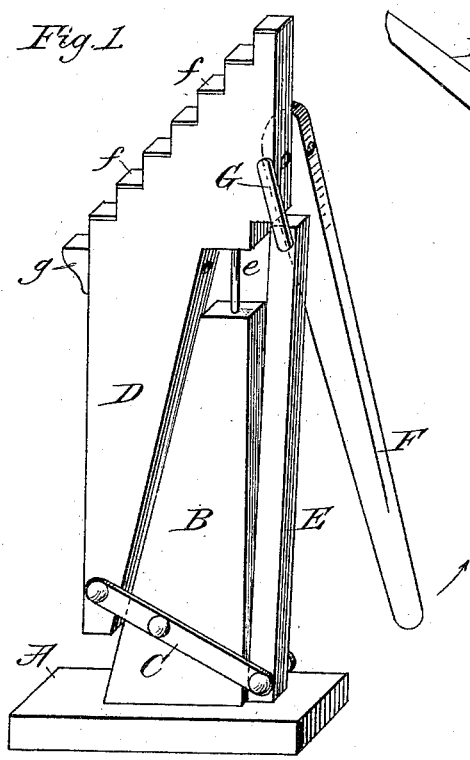
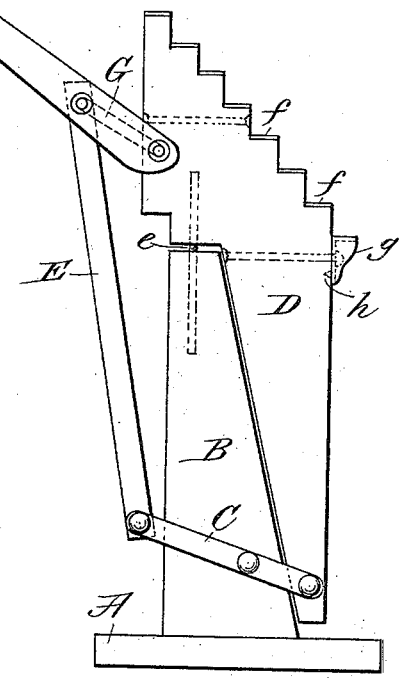
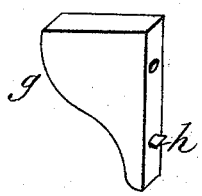
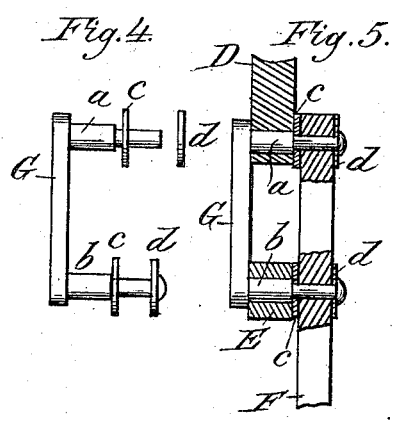
Attest:
F. H. Schott
A. R. Brown.
Inventor:
Adin P. Joy

UNITED STATES PATENT OFFICE.

ADIN PHILLIPS JOY, OF NEW MARKET JUNCTION, NEW HAMPSHIRE.

LIFTING-JACK.

SPECIFICATION forming part of Letters Patent No. 298,980, dated May 20, 1884.

Application filed April 3, 1884. (No model.)

*To all whom it may concern:*

Be it known that I, ADIN PHILLIPS JOY, a citizen of the United States, residing at New Market Junction, in the county of Rockingham and State of New Hampshire, have invented certain new and useful Improvements in Lifting-Jacks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improved wagon-jack; and it consists in the construction, arrangement, and combination of parts, as hereinafter more fully described and claimed.

In the annexed drawings, illustrating the invention, Figure 1 is a perspective view of my improved wagon-jack. Fig. 2 is a side elevation of the same. Figs. 3, 4, and 5 are detail views.

Like letters designate like parts.

A is a bed-piece or base, to which is firmly secured a standard, B, one side of which is formed with an incline, as shown. To the lower part of this standard on each side is pivoted a lever, C. The forward ends of the levers C C are connected to the lower end of an adjustable rest-piece, D, while the rear ends of said levers are attached to a rod or bar, E, that connects with the operating lever or handle F, by which the rest-piece D is actuated. The rest-piece D, connecting-bar E, and handle F are connected by a link, G, Fig. 4. This link is provided at one end with an arm, $a$, that is passed through the rest-piece, and forms a pivot for the end of the handle. At its other end it has a similar arm, $b$, that is passed through the handle and connecting-bar, as shown in Figs. 1 and 5. These arms $a$ and $b$ are shouldered, as shown in Figs. 4 and 5, to afford a bearing for washers $c\ c$, that are placed between the handle F and the rest-piece and connecting-bar, respectively, other washers $d\ d$ being secured also to the ends of the arms or pivots $a\ b$ at the outer side of the handle.

In the top of the standard B is fixed a dowel or guide pin, $e$, that enters a mortise or opening in the rest-piece, whereby the latter is enabled to move accurately in a vertical line when actuated by the handle F and connected mechanism. The rear and under side of the rest-piece is formed to correspond with the form of the standard B, as shown in Figs. 1 and 2, and is recessed so as to receive the upper end of the connecting-bar E when the rest-piece is raised to its full height. The upper part of the rest-piece is stepped or notched in the usual manner, and these steps or notches are preferably faced with metal plates $f$, to prevent wear.

A supplemental rest, $g$, Fig. 3, composed of metal, with a spur, $h$, is secured to the front of the rest-piece D by means of a countersunk bolt, as shown in Fig. 2, the spur $h$ serving to prevent the rest $g$ from turning on its bolt. The bolt by which this rest $g$ is secured also serves to prevent the rest-piece D from splitting, and other bolts may also be employed for a similar purpose.

The operation of the jack will be readily understood. It will be seen that by throwing the handle F down, as shown in Fig. 1, the connecting-bar E will be brought into a vertical or nearly vertical position, thus forcing down the rear ends of the levers C C, and causing their forward ends to raise the rest-piece D, the pin or dowel $e$ serving as a guide to steady the rest-piece in its upward movement. It will also be observed that by means of the levers C, link G, and connecting rod or bar E a compound purchase is obtained, the levers C and link G being caused to act together in raising and lowering the jack through their connection with the operating-handle.

Having thus described my invention, what I claim as new, and desire to secure by Letters Patent, is—

1. In a lifting-jack, the combination, with the standard B and rest-piece D, of the levers C C, handle F, link G, and connecting rod or bar E, substantially as described.

2. In a lifting-jack, the combination, with the notched rest-piece D, of the supplemental rest $g$, having a spur, $h$, and secured to the rest-piece, substantially as described.

3. In a lifting-jack, the combination of the standard B, the notched and recessed rest-piece D, having a supplemental rest, $g$, the levers C C, handle F, link G, and connecting-bar E, substantially as described.

In testimony whereof I affix my signature in presence of two witnesses.

ADIN PHILLIPS JOY.

Witnesses:
FRED S. HATCH,
GEORGE F. JOY.